(12) United States Patent
Biddulph et al.

(10) Patent No.: US 9,518,658 B2
(45) Date of Patent: Dec. 13, 2016

(54) ROTARY ENGINE ROTOR

(75) Inventors: Christopher John Biddulph, Lichfield (GB); Jonathan Mark Bagnell, Lichfield (GB)

(73) Assignee: UAV Engines Ltd. (GB)

( * ) Notice: Subject to any disclaimer, the term of this patent is extended or adjusted under 35 U.S.C. 154(b) by 0 days.

(21) Appl. No.: 14/004,001

(22) PCT Filed: Mar. 5, 2012

(86) PCT No.: PCT/GB2012/050480
§ 371 (c)(1),
(2), (4) Date: Nov. 22, 2013

(87) PCT Pub. No.: WO2012/120285
PCT Pub. Date: Sep. 13, 2012

(65) Prior Publication Data
US 2014/0069273 A1    Mar. 13, 2014

(30) Foreign Application Priority Data

Mar. 10, 2011  (EP) .................................. 11157738

(51) Int. Cl.
*F01C 1/00*     (2006.01)
*F01C 1/22*     (2006.01)
(Continued)

(52) U.S. Cl.
CPC .................. *F16J 1/001* (2013.01); *F01C 1/22* (2013.01); *F01C 21/06* (2013.01); *F01C 21/08* (2013.01)

(58) Field of Classification Search
CPC .............. F16J 1/001; F01C 1/22; F01C 21/06; F01C 21/08
(Continued)

(56) References Cited

U.S. PATENT DOCUMENTS 3,802,810 A * 4/1974 Reitz et al. .................. 418/61.2
3,942,918 A * 3/1976 Hermes ........................ 418/61.2
(Continued)

*Primary Examiner* — Nicholas J Weiss
*Assistant Examiner* — Jason T Newton
(74) *Attorney, Agent, or Firm* — GrayRobinson, P.A.; Michael J. Colitz, III

(57) ABSTRACT

A rotary engine rotor (10) comprises a body (12) comprising an outer surface (18), an inner surface (22), an insert (14) and a fixing member (16). The outer surface (18) comprises three rotor sides (20) arranged in an equilateral triangle shape. The inner surface (22) comprises a lo¬cation portion (24) at the midpoint of each rotor side (20), the location portions (24) together defining a location aperture (26). One location portion (24) is provided with a first fixing socket (28) extending radial¬ly from the inner surface (22) of the body (12), towards the outer sur¬face (18) of the body (12). Cooling channels (30) are provided axially through the body (12) in the region of each apex (31). The insert (14) is provided in the location aperture (26) and comprises a bearing part (38) with a second fixing socket (40) extending radially through the in¬sert (14) and in alignment with the first fixing socket (28). The fixing member (16) is provided through the second fixing socket (40) and received in the first fixing socket (28) to couple the insert (14) to the body (12).

11 Claims, 5 Drawing Sheets

(51) Int. Cl.
  *F16J 1/00* (2006.01)
  *F01C 21/06* (2006.01)
  *F01C 21/08* (2006.01)

(58) Field of Classification Search
  USPC .......................................... 123/200; 418/61.2
  See application file for complete search history.

(56) References Cited

U.S. PATENT DOCUMENTS 4,486,159 A * 12/1984 Garside .................. 418/61.2
4,772,189 A *  9/1988 Garside .................. 418/61.2
4,898,522 A *  2/1990 Edelmayer ............... 418/61.2

* cited by examiner

ROTARY ENGINE ROTOR

CLAIM OF PRIORITY

This application is a continuation of and claims priority under 35 U.S.C §371 to International Application No. PCT/GB2012/050480 filed on Mar. 5,2012, which in turn claims priority to EP 111577383 filed on Mar. 10, 2011. The contents of both these application are incorporated herein by reference for all purposes.

The present invention relates to a rotary engine rotor.

Rotary internal combustion engines are well known and typically comprise a rotary piston or rotor rotatably mounted within a cavity in a housing or stator. The rotor and the walls of the cavity are shaped so that combustion chambers are formed as the rotor rotates, the walls of the cavity further being provided with inlet and exhaust ports for air and exhaust gases respectively. Wankel engines are a particular form of rotary internal combustion engine in which the stator is provided with a two-lobed epitrochoidal bore lo which forms the cavity and further comprises end plates which form axially spaced end walls closing the cavity. The rotor is provided with a body which comprises an outer surface comprising three rotor sides of generally equilateral triangular sectional shape with outwardly curved sides. The rotor is mounted on an eccentric journal of a main shaft and is geared to rotate in a planetary manner within the cavity at one third of the rotation of the main shaft. The gearing of the rotor is typically provided by means of an insert received within a location aperture provided by an inner surface of the body. The insert comprises a bearing part and an indexing gear, the indexing gear being arranged to engage with a fixed gear carried by one of the end plates of the engine. The engagement of the indexing gear with the fixed gear constrains the rotation of the rotor to one third that of the main shaft. The insert is required to be firmly secured to the body of the rotor in order to prevent rotation or axial movement of the insert relative to the rotor body. This may enable prolonged operation of the rotor at high rotational speeds such as when employed within rotary engines which may be used in boats, automobiles, aeroplanes, stationary engines or compressors for example. The coupling of the insert to the body should also not deleteriously interfere with the working operation of the chambers formed by the rotating rotor and the cavity.

According to an aspect of the present invention there is provided a rotary engine rotor comprising:
- a body comprising:
  - an outer surface comprising three rotor sides arranged in a generally equilateral triangle shape; and
  - an inner surface comprising: a respective location portion provided generally at the midpoint of each rotor side, the location portions together defining at least in part a location aperture and one location portion being provided with a first fixing socket extending generally radially from the inner surface of the body, part way towards the outer surface of the body; and
  - a cooling channel provided axially through the body in the region of each apex;
- an insert provided in the location aperture and comprising a bearing part and an indexing gear, the bearing part being provided with a second fixing socket extending generally radially through the insert and provided in alignment with the first fixing socket; and
- a rigid elongate fixing member provided through the second fixing socket and at least partially received in the first fixing socket to thereby couple the insert to the body.

By arranging the fixing sockets and fixing member to extend outwardly from an internal position, disruption of the outer surface of the body of the rotor may be prevented and thus the risk of formation of a gas leak path between the outer surface and the inner surface of the rotor body is reduced. A further advantage of this arrangement is that creation of "hot-spots" on the outer surface may be reduced. Weld-heat cracking of the outer surface may also be avoided as no welding is required on said outer surface. There is also no constraint on the shape or profile of the outer surface as the first fixing socket does not impinge upon it.

Preferably, each rotor side of the outer surface of the body is provided with a combustion chamber recess formed in the outer surface and extending part way towards the inner surface and the first fixing socket is further arranged to extend from the inner surface of the body part way towards the respective combustion chamber recess. The recess is arranged to form a combustion chamber between the rotor side and a cavity provided by an external stator within which the rotor is arranged to be housed in use. Because the first fixing socket extends only part-way towards the combustion chamber, the socket and the fixing member do not impinge on the combustion chamber recess. This may provide flexibility in the location of the recess in the rotor side.

Preferably, the first fixing socket extends from the inner surface of the body, part way towards the outer surface of the body generally within a region located between the respective combustion chamber recess and cooling channel. This may allow the length of the fixing member and thus the strength of the coupling to be maximised whilst ensuring that the first and second fixing sockets and fixing member do not impinge on the combustion chamber recess.

Preferably a said rigid elongate fixing member and first and second fixing sockets are provided on each side of the rotor body, each fixing member being received in a respective first and second fixing socket in corresponding positions along the location portions of the rotor body. This may improve the engagement between the body and the insert whilst retaining the balance of the rotor and allowing stable rotation at high rotational speeds.

Preferably, each location portion is part-circular in shape and the location portions together define a location aperture of substantially circular section. This enables the location aperture to receive an insert of substantially circular shape and may further improve the balance of the rotor, allowing stable rotation at high rotational speeds.

Preferably each cooling channel is provided between a respective pair of location portions, the cooling channels and the insert together forming cooling conduits. The cooling conduits allow the flow of air for cooling of the rotor during operation.

Preferably, each first and second fixing socket extend generally transverse to the axis of rotation of the rotor at an angle of between 70° to 90° to a tangent to the insert. This may enable increased flexibility in the positioning of each first and second fixing socket, and an improved manufacturing tolerance during the manufacturing process.

Preferably, the rotary engine rotor is for a Wankel engine or a compressor.

Embodiments of the invention will now be described in detail by way of example only, with reference to the accompanying drawings, in which.

Figure 1:
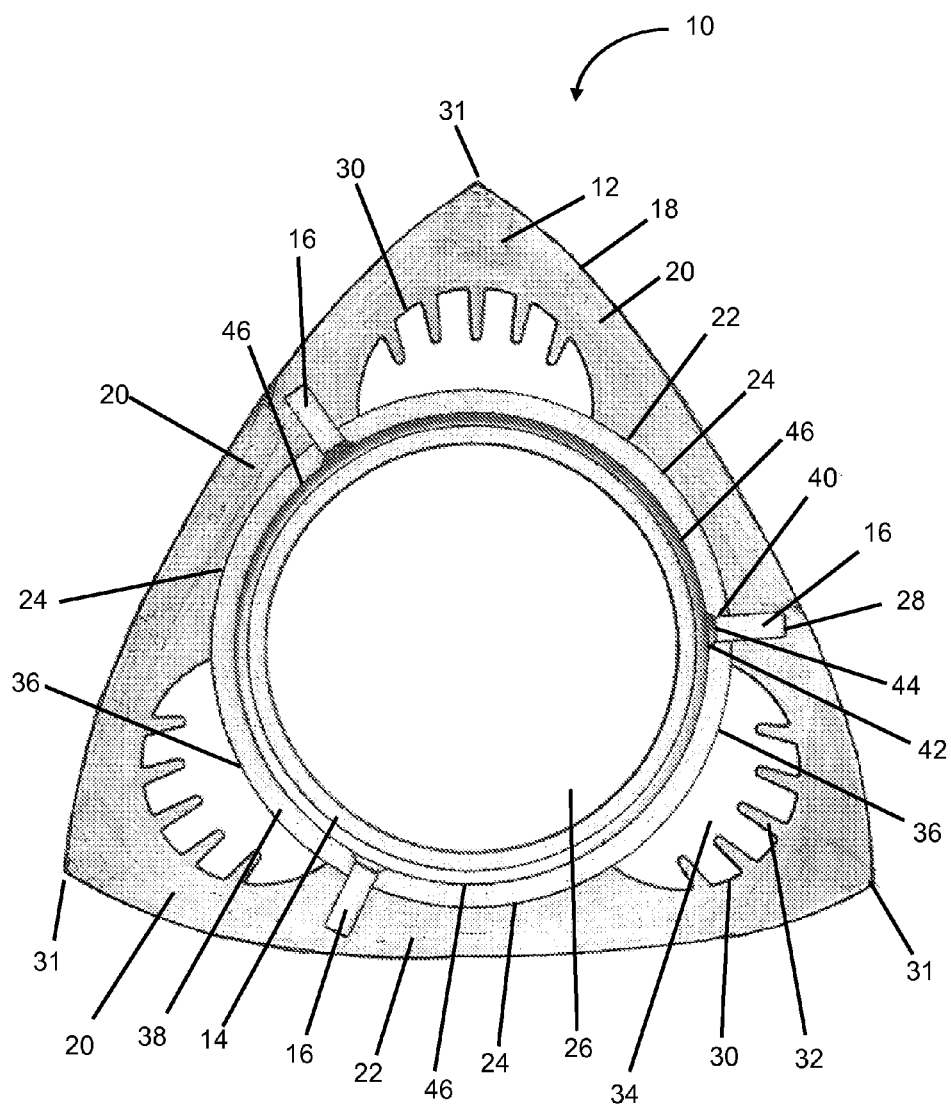
FIG. 1 is a cross-sectional diagrammatic representation of a rotary engine rotor according to a first embodiment of the invention.
Figure 2:
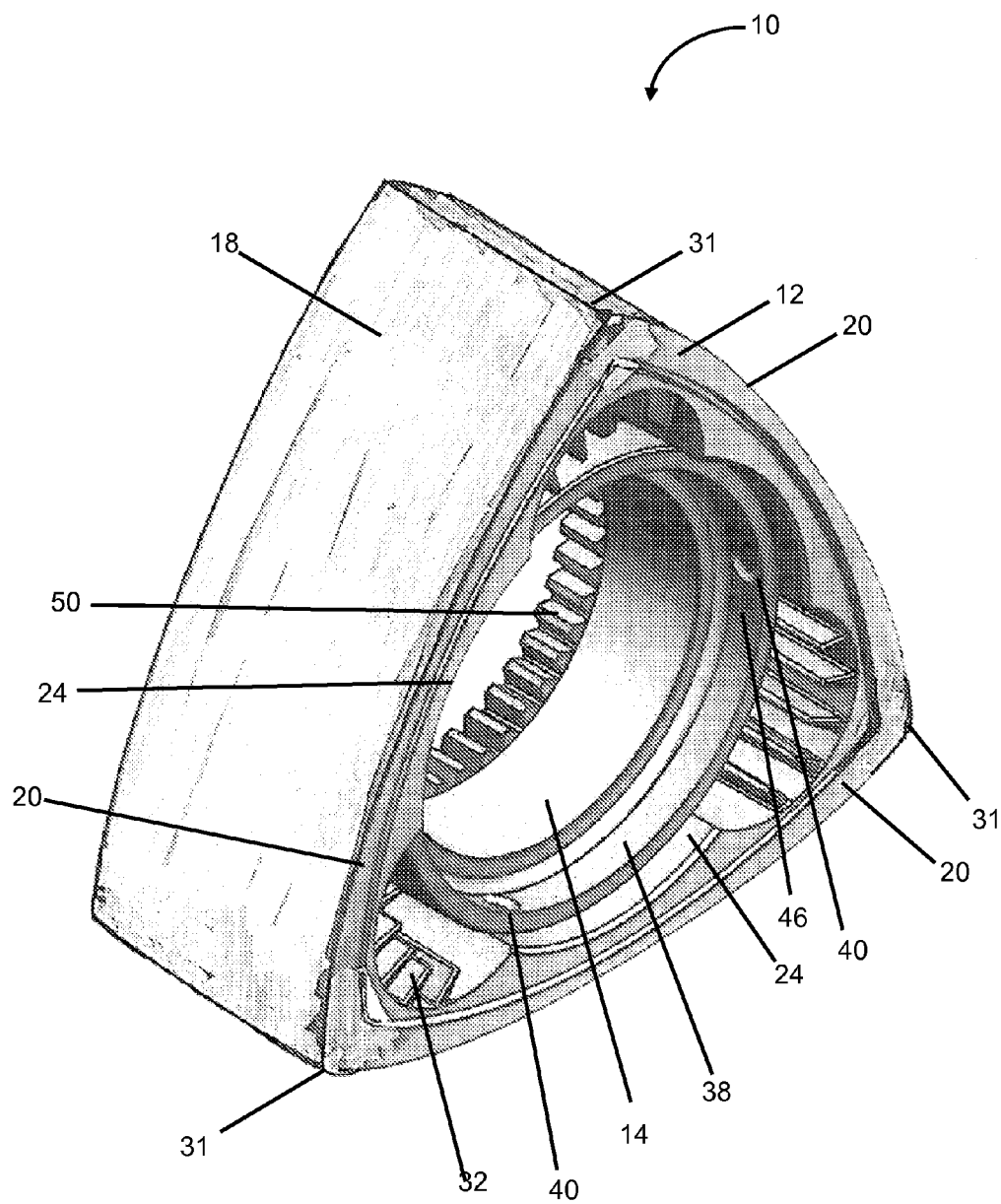
FIG. 2 is a perspective view of the rotary engine rotor of FIG. 1.

Referring to FIGS. 1 and 2 a first embodiment of the invention provides a rotary engine rotor 10 comprising a body 12, an insert 14 and rigid elongate fixing members 16.

The body 12 comprises an outer surface 18 comprising three rotor sides 20 arranged in a generally equilateral triangle shape. Each rotor side 20 is outwardly curved in shape. The body 12 further comprises an inner surface 22 comprising three location portions 24, each location portion being provided generally at the midpoint of a respective rotor side 20. The location portions 24 together partly define a location aperture 26. In this example, each location portion 24 is provided with a first fixing socket 28 which extends generally radially from the inner surface 22 part-way towards the outer surface 18.

The body 12 further comprises three cooling channels 30, a respective cooling channel 30 being provided axially through the body 12 in the region of each apex 31 of the body 12. Each respective cooling channel 30 is part cylindrical in shape and provided with cooling fins 32 which are arranged to increase the surface area of said cooling channel 30. Each cooling channel 30 is provided between a respective pair of location portions 24 so that the cooling channels and an outer surface 36 of the insert 14 together form cooling conduits 34. The cooling conduits 34 allows for the flow of cooling air through the rotor 10.

The insert 14 is provided in the location aperture 26 and comprises a bearing part 38 and an indexing gear 50. The indexing gear 50 comprises a machined ring gear and is disposed at one end axially of the rotor 10, as shown in FIG. 2. The bearing part 38 is provided with a second fixing socket 40 which extends generally radially through the insert 14. The insert 14 is arranged within the location aperture 26 such that the second fixing socket 40 is provided in alignment with the first fixing socket 28.

Each rigid elongate fixing member 16 is provided through a respective second fixing socket 40 and is received in a respective first fixing socket 28, to thereby couple the insert 14 to the body 12. In this example, each fixing member 16 comprises a fixing pin. Each fixing pin 16 is a drive fit with the respective second 40 and first 28 fixing sockets so as to provide secure coupling of the insert 14 to the rotor body 12. Each fixing pin 16 is received in a respective second 40 and first 28 fixing socket in corresponding positions along the location portions 24 of the rotor body 12. This enables stable operation of the rotor at high rotational speeds by retaining the balance of the rotor 10. In this example, each respective first fixing socket 28, second fixing socket 40 and fixing pin 16 is arranged to extend at an angle of substantially 90° to a tangent to the insert 14. If desired, the respective first fixing socket 28, second fixing socket 40 and fixing pin 16 could extend at other angles, although preferably fixing pins do not extend at an angle of less than 70° to a tangent to the insert 14. In this embodiment, each first fixing socket 28 may be positioned anywhere along the inner surface 22, between the cooling conduits 24. This may enable increased flexibility in the positioning of each first and second fixing socket and an improved manufacturing tolerance during the manufacturing process.

The rotor body 12 may be made as a one-piece casting in iron whilst the insert 14 may be made as a forging in an appropriate bearing steel, or from a bar of bearing steel. The fixing pins 16 are preferably made in high grade stainless steel and thus differential expansion between the rotor body 12, insert 14 and pins 16 is minimised. To further secure the insert 14 to the rotor body 12, the head 44 of each fixing pin 16 may be welded to the insert 14 within a respective bullnose shaped bore 42. It will be appreciated that any other machined shaped bore may be alternatively used. Excess welding material may be subsequently removed so that the remainder of each head 44 and welding material lies flush with the inner surface 46 of the insert 14, but it will be appreciated that the removal of excess welding material is not essential In use, the rotor 10 is mounted within a cavity (not shown) in a stator (not shown) on an eccentric journal of a main shaft (not shown). The ring gear 50 is arranged to engage with an external fixed gear (not shown) in a planetary manner and said engagement ensures that the rotor 10 rotates at one third of the rotation of the main shaft. The rotor 10 and the walls of the cavity are shaped so that combustion chambers are formed as the rotor rotates, the walls of the cavity further being provided with inlet and exhaust ports (not shown) for air and exhaust gases respectively. By arranging each first fixing socket 28, second fixing socket 40 and fixing pin 16 to extend outwardly from an internal position, disruption of the outer surface 18 of the body 12 of the rotor 10 is prevented. In this way, the risk of formation of a gas leak path between the outer surface 18 and the inner surface 22 of the rotor body 12 is reduced. A further advantage of this arrangement is that creation of "hot-spots" on the outer surface may be reduced. Weld-heat cracking of the outer surface may also be avoided as no welding is required on said outer surface. There is also no constraint on the shape or profile of the outer surface 18 as the first fixing socket 28 does not impinge upon it.

Figure 3:
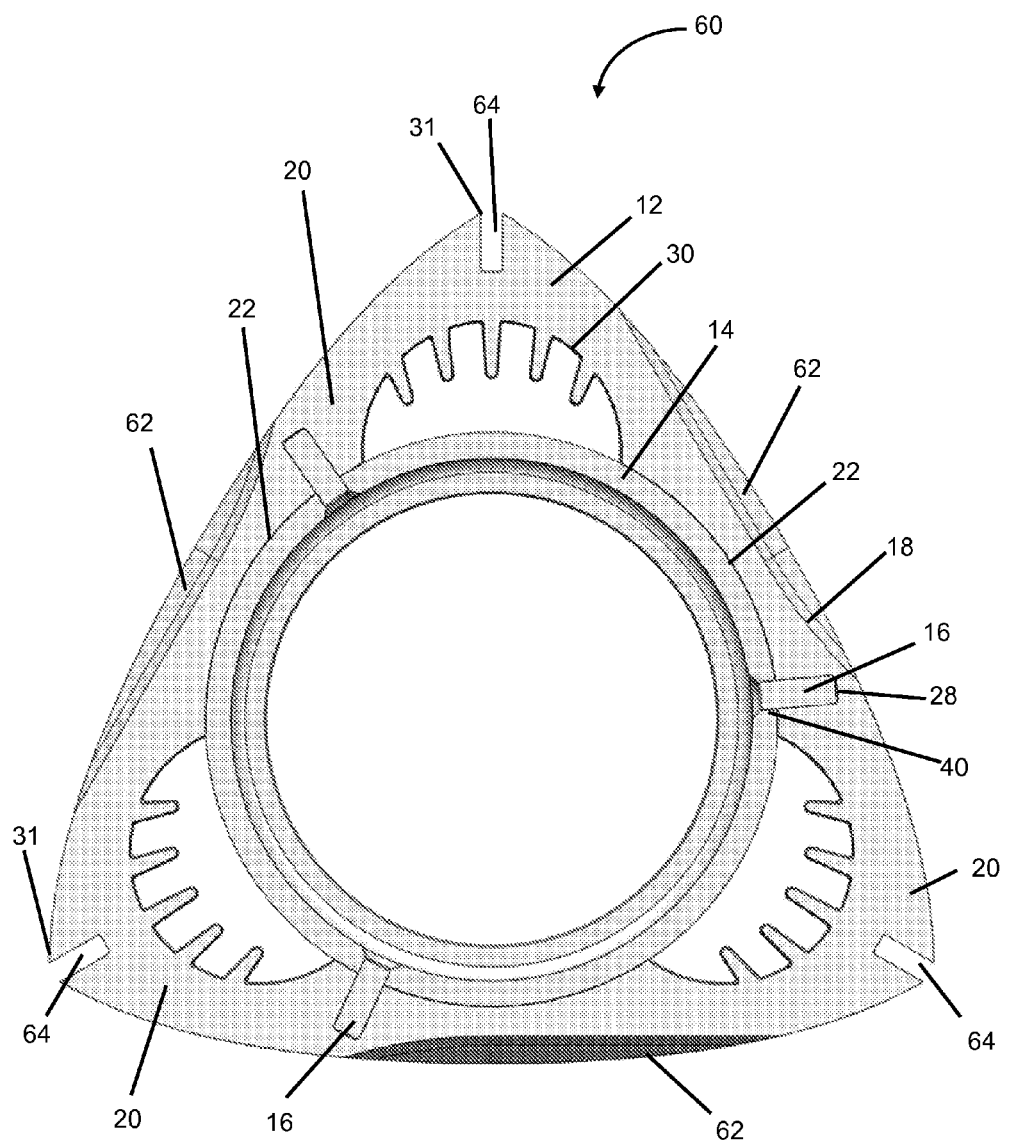
FIG. 3 is a cross-sectional diagrammatic representation of a rotary engine rotor according to a second embodiment of the invention.
Figure 4:
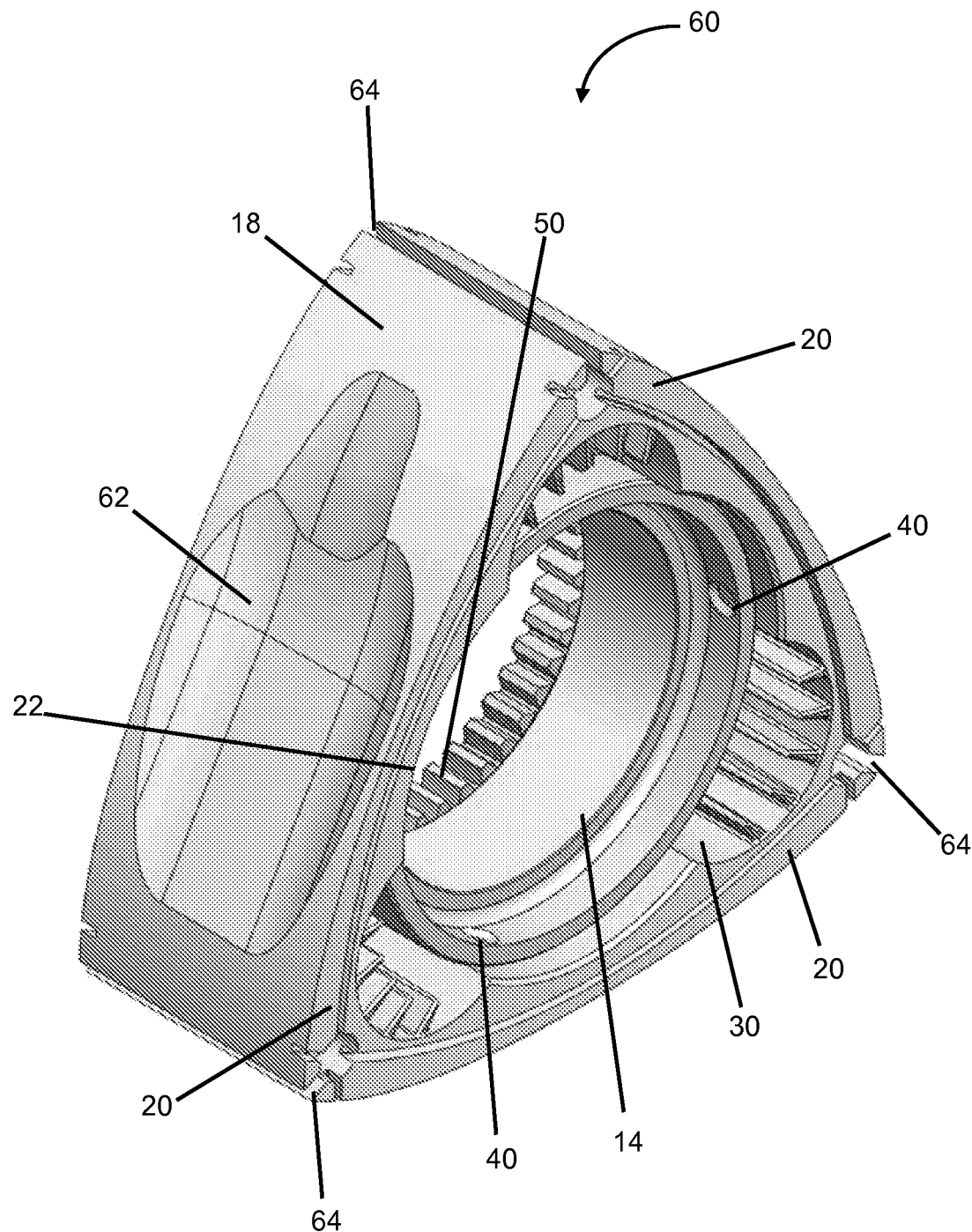
FIG. 4 is a perspective view of the rotary engine rotor of FIG. 3.

A second embodiment of the invention provides a rotary engine rotor 60 for a Wankel engine as shown in FIGS. 3 and 4. The rotor 60 of this embodiment is similar to the rotor 10 of the first embodiment, with the following modifications. The same reference numbers are retained for corresponding features.

In this embodiment the body 12 of the rotor 60 is additionally provided with three combustion chamber recesses 62, one on each rotor side 20. Each combustion chamber recess 62 comprises a combustion pocket formed in the outer surface 18 of a respective rotor side 20. Each combustion pocket 62 extends generally about the mid-point of the respective rotor side and extends part way towards the inner surface 22 of said rotor side. In use, the combustion pocket 62 is arranged to form a combustion chamber between the rotor side 20 and a cavity provided by an external stator (not shown) within which the rotor is arranged to be housed. In this embodiment, each first fixing socket 28 extends from the inner surface 22 of the body 12, part way towards the outer surface 18 of the body generally towards a region located between the respective combustion pocket 62 and cooling channel 30. This allows the length of the fixing pin 16 and thus the strength of the coupling of the insert 14 to the body 12 to be maximised whilst ensuring that the first 28 and second 40 fixing sockets and fixing pin 16 do not impinge on the combustion pocket 62.

Each apex 31 of the body 12 is further provided with a sealing strip socket 64. Each sealing strip socket 14 is arranged to receive a sealing strip (not shown) which in use forms a seal between the rotor 10 and a wall of the engine cavity provided by the external stator.

Figure 5:
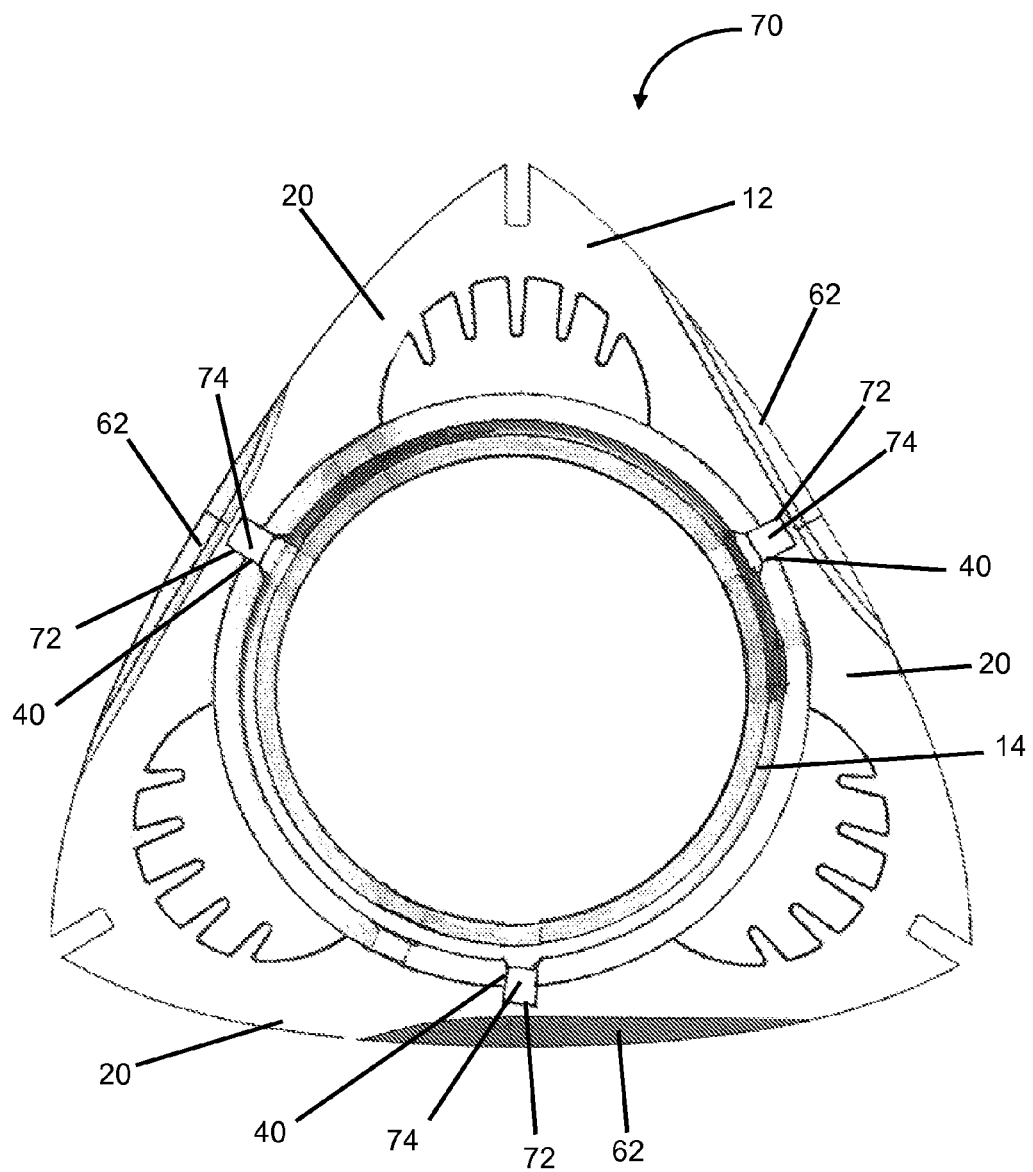
FIG. 5 is a cross-sectional diagrammatic representation of a rotary engine rotor according to a third embodiment of the invention.

A third embodiment of the invention provides a rotary engine rotor 70 for a Wankel engine as shown in FIG. 5. The rotor 70 of this embodiment is similar to the rotor 60 of the second embodiment, with the following modifications. The same reference numbers are retained for corresponding features.

In this embodiment the body 12 is provided with a first fixing socket 72, a second fixing socket 40 and a fixing pin 74 generally at the mid-point of each rotor side 20. Each first fixing socket 72 is arranged to extend generally radially from the inner surface 22 of the body 12 part way towards the respective combustion pocket 62. Each fixing pin 74 is provided through a respective second fixing socket 40 and is received in a respective first fixing socket 72, to thereby couple the insert 14 to the body 12. Each first fixing socket 72 and respective fixing pin 74 do not impinge on the combustion pocket 62. In this embodiment, because each first fixing socket 72 extends only part-way towards the combustion pocket 62, each fixing pin 74 and each first fixing socket 72 do not impinge on the combustion pocket. An improvement in the flexibility of the location and size of the pocket 62 in the rotor side 20 may thereby be achieved.

The invention claimed is:

1. A rotary engine rotor comprising:
    a body comprising:
        an outer surface comprising three radially spaced rotor sides that meet at three radially spaced apexes, so that the radially spaced rotor sides are arranged in a generally equilateral triangle shape; and
        an inner surface comprising:
            a respective location portion provided generally at the midpoint of each rotor side, the location portions together defining at least in part a location aperture and one location portion being provided with a first fixing socket extending generally radially from the inner surface of the body, away from any of the apexes, and only part way towards the outer surface of the body in such a way that the first fixing socket does not impinge on the outer surface; and a cooling channel provided axially through the body in the region of each apex;
    an insert provided in the location aperture and comprising a bearing part and an indexing gear, the bearing part being provided with a second fixing socket extending generally radially through the insert and provided in alignment with the first fixing socket; and
    a rigid elongate fixing member provided through the second fixing socket and at least partially received in the first fixing socket to thereby couple the insert to the body.

2. A rotor as claimed in claim 1, wherein each rotor side of the outer surface of the body is provided with a combustion chamber recess formed in the outer surface and extending part way towards the inner surface and the first fixing socket is further arranged to extend from the inner surface of the body part way towards the respective combustion chamber recess.

3. A rotor as claimed in claim 2, wherein the first fixing socket extends from the inner surface of the body, part way towards the outer surface of the body generally within a region located between the respective combustion chamber recess and cooling channel.

4. A rotor as described in claim 1, wherein a said rigid elongate fixing member and first and second fixing sockets are provided on each of said three sides of the rotor body, each fixing member being received in a respective first and second fixing socket in corresponding positions along the location portions of the rotor body.

5. A rotor as described in claim 1, wherein each location portion is part-circular in shape and the location portions together define a location aperture of substantially circular section.

6. A rotor as described in claim 1, wherein each cooling channel is provided between a respective pair of location portions, the cooling channels and the insert together forming cooling conduits.

7. A rotor as described in claim 1, wherein each first and second fixing socket extend generally transverse to the axis of rotation of the rotor at an angle of between 70° to 90° to a tangent to the insert.

8. A rotor as described in claim 1, wherein the rotary engine rotor is for a Wankel engine or a compressor.

9. A rotor as described in claim 1, wherein the first fixing socket is not welded on the outer surface.

10. A rotary engine rotor comprising:
    a rotor body having a triangular perimeter defined by three radially spaced outer surfaces that meet at three radially spaced apexes, the outer surfaces extending axially between a pair of opposed rotor sides;
    an inner surface of the rotor body defining a circular aperture extending axially through the rotor body through the pair of opposed rotor sides, the inner surface including a plurality of first fixing sockets that extend through the inner surface, radially toward the perimeter and away from any of the apexes, and terminate before reaching an outer surface so as not to impinge on the outer surface;
    an annular insert positioned within the aperture and including a plurality of second fixing sockets co-aligned with the first fixing sockets, the insert having a bearing part and an indexing gear;
    a rigid elongated fixing member positioned in the co-aligned first and second fixing sockets to thereby couple the insert to the body; and
    a cooling channel extending axially through the rotor body in the region of each apex.

11. A rotor as described in claim 10, wherein the first fixing socket is not welded on an outer surface.

* * * * *